United States Patent
Seddon et al.

(10) Patent No.: US 7,079,734 B2
(45) Date of Patent: Jul. 18, 2006

(54) FIBER OPTIC DROP CABLES SUITABLE FOR FIBER TO THE SUBSCRIBER APPLICATIONS

(75) Inventors: David A. Seddon, Hickory, NC (US); William C. Hurley, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/020,778

(22) Filed: Dec. 22, 2004

(65) Prior Publication Data

US 2006/0133748 A1    Jun. 22, 2006

(51) Int. Cl.
G02B 6/44 (2006.01)
(52) U.S. Cl. .................. 385/102; 385/113
(58) Field of Classification Search ......... 385/100–114
See application file for complete search history.

(56) References Cited

U.S. PATENT DOCUMENTS

| | | | |
|---|---|---|---|
| 4,317,000 A * | 2/1982 | Ferer .................. | 174/70 R |
| 4,467,138 A | 8/1984 | Brorein ................ | 174/115 |
| 4,729,628 A * | 3/1988 | Kraft et al. ............ | 385/104 |
| 4,761,053 A | 8/1988 | Cogelia et al. ........ | 350/96.23 |
| 4,776,664 A | 10/1988 | Okura .................. | 350/96.23 |
| 4,787,705 A | 11/1988 | Shimoto et al. ........ | 350/96.23 |
| 4,892,382 A | 1/1990 | Story et al. ........... | 350/96.23 |
| 5,050,957 A | 9/1991 | Hamilton et al. ....... | 385/113 |
| 5,121,458 A * | 6/1992 | Nilsson et al. ......... | 385/100 |
| 5,180,890 A | 1/1993 | Pendergrass et al. .... | 174/117 |
| 5,233,678 A * | 8/1993 | Katurashima et al. .... | 385/112 |
| 5,369,720 A * | 11/1994 | Parry et al. ........... | 385/114 |
| 5,509,097 A * | 4/1996 | Tondi-Resta et al. .... | 385/113 |
| 5,561,729 A | 10/1996 | Parris ................. | 385/113 |
| 5,566,266 A | 10/1996 | Nave et al. ........... | 285/113 |
| 5,651,081 A | 7/1997 | Blew et al. ........... | 385/101 |
| 6,188,821 B1 | 2/2001 | McAlpine et al. ....... | 385/100 |
| 6,249,628 B1 * | 6/2001 | Rutterman et al. ...... | 385/106 |
| 6,249,629 B1 | 6/2001 | Bringuier ............. | 385/113 |
| 6,256,438 B1 | 7/2001 | Gimblet ............... | 385/109 |
| 6,311,000 B1 | 10/2001 | Schneider ............. | 385/113 |
| 6,356,690 B1 | 3/2002 | McAlpine et al. ....... | 385/109 |
| 6,400,873 B1 | 6/2002 | Gimblet et al. ........ | 385/102 |
| 6,487,345 B1 | 11/2002 | Dixon et al. .......... | 385/100 |
| 6,487,347 B1 | 11/2002 | Bringuier ............. | 385/113 |
| 6,501,888 B1 | 12/2002 | Gimblet et al. ........ | 385/113 |
| 6,529,663 B1 | 3/2003 | Parris et al. ......... | 385/113 |
| 6,542,674 B1 | 4/2003 | Gimblet ............... | 385/113 |
| 6,546,175 B1 | 4/2003 | Wagman et al. ......... | 385/113 |
| 6,563,990 B1 | 5/2003 | Hurley et al. ......... | 385/101 |
| 6,567,592 B1 * | 5/2003 | Gimblet et al. ........ | 385/113 |
| 6,714,710 B1 | 3/2004 | Gimblet ............... | 385/113 |
| 2003/0026559 A1 * | 2/2003 | VanVickle et al. ...... | 385/112 |
| 2004/0197059 A1 * | 10/2004 | Castellani et al. ..... | 385/113 |

OTHER PUBLICATIONS

NEPTCO Incorporated "Fiber Optic Cable Components", Apr. 2003.

* cited by examiner

Primary Examiner—Michelle Connelly-Cushwa
Assistant Examiner—Chris Chu
(74) Attorney, Agent, or Firm—Michael E. Carroll, Jr.

(57) ABSTRACT

A fiber optic drop cable is disclosed that includes at least one optical waveguide disposed within a tube, a first and second strength assembly, and a cable jacket. Each strength assembly includes a strength component and a plurality of strength members, wherein the respective plurality of strength members are radially disposed about at least half of the circumference of the respective strength component. In one embodiment, the first and second strength assemblies are generally disposed on opposite sides of the tube.

22 Claims, 9 Drawing Sheets

FIBER OPTIC DROP CABLES SUITABLE FOR FIBER TO THE SUBSCRIBER APPLICATIONS

FIELD OF THE INVENTION

The present invention relates generally to fiber optic drop cables. More specifically, the invention relates to fiber optic drop cables suitable for outdoor applications such as fiber to the subscriber applications.

BACKGROUND OF THE INVENTION

Communication networks are used to transport a variety of signals such as voice, video, data transmission, and the like. Traditional communication networks use copper wires in cables for transporting information and data. However, copper cables have drawbacks because they are large, heavy, and can only transmit a relatively limited amount of data. Consequently, optical waveguide cables replaced most of the copper cables in long-haul communication network links, thereby providing greater bandwidth capacity for long-haul links. However, most communication networks use copper cables for distribution and/or drop links on the subscriber side of the central office. In other words, subscribers have a limited amount of available bandwidth due to the constraints of copper cables in the communication network. Stated another way, the copper cables are a bottleneck that inhibit the subscriber from utilizing the relatively high-bandwidth capacity of the long-haul links.

As optical waveguides are deployed deeper into communication networks, subscribers will have access to increased bandwidth. But there are certain obstacles that make it challenging and/or expensive to route optical waveguides/optical cables deeper into the communication network, i.e., closer to the subscriber. For instance, laying the last mile of fiber to the subscriber requires a low-cost fiber optic cable that is craft-friendly for installation, connectorization, slack storage, and versatility. Moreover, the reliability and robustness of the fiber optic cable must withstand the rigors of an outdoor environment.

Figure 1:
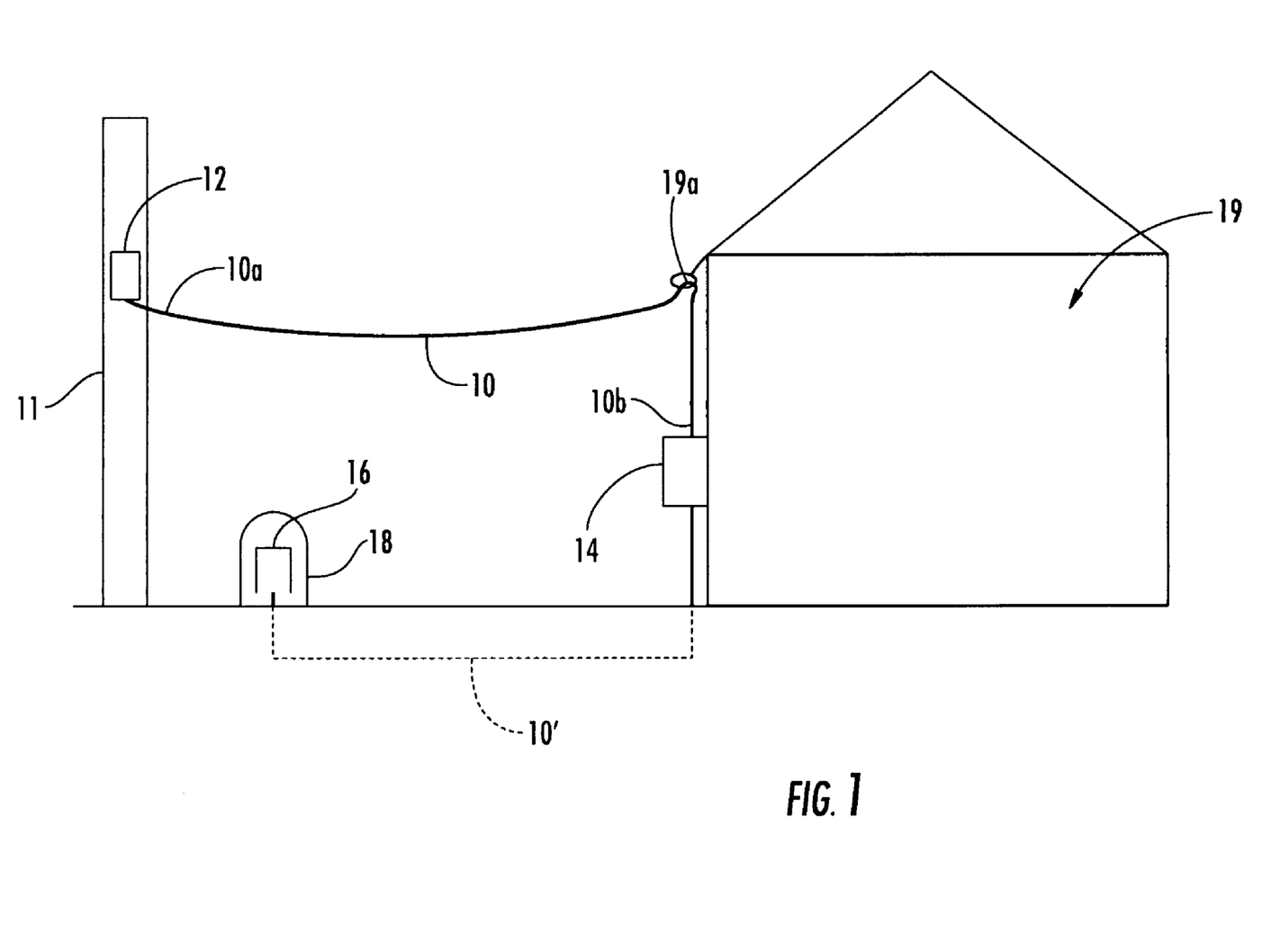
FIG. 1 schematically depicts a portion of an optical communication network for providing fiber to the subscriber at location 'x' (FTTx).

FIG. 1 schematically illustrates two different methods for routing fiber optic cables to a premises 19. Specifically, FIG. 1 shows a first method of routing a cable 10 to premises 19 in an aerial application and a second method using a cable 10' routed to premises 19 in a buried application. In an exemplary aerial application, cable 10 has a first end 10a that is attached at a first interface device 12 located on pole 11 and a second end 10b that is routed to an interface device 14 at premises 19. At the premises the cable is terminated and attached with a clamp such as a P-clamp positioned at a tie point 19a of premises 19. In the aerial application, the fiber optic cable must be able to carry a predetermined tensile load and also withstand wind and ice loading. In buried applications, the first and second ends of cable 10' are respectively routed to pedestal 18 and connected to interface device 16 and routed and connected to interface device 14. In some buried cable applications, the cable is required to withstand the tensile load associated with pulling the cable through a duct.

Conventional outdoor cables use rigid strength elements having relatively large diameters for carrying tensile loads and inhibiting shrinkage of the cable such as a steel or a glass reinforced plastic rod. However, these relatively large rigid strength members make the cable very stiff and relatively large, but the cable designs preserve optical performance in the outdoor environment. In other words, the conventional outdoor cables were designed to be stiff and inhibit bending, thereby protecting the optical fibers therein. However, these conventional outdoor cables dramatically increased the bending radius of the cable and when coiled the strength members act like a coiled spring that wants to unwind. Consequently, these conventional outdoor cables are difficult for the craft to handle in the field and as well as being difficult to work with in factory because the rigid strength members.

Cables have used other strength members such as conventional fiberglass yarns, but they require a relatively large number of conventional yarns and provide little or no anti-buckling strength compared with rigid strength members. Additionally, these types of cable may not withstand the rigors of the outdoor environment with the desired level of reliability. Moreover, the use of a relatively large number of conventional fiberglass yarns increases the manufacturing complexity along with cost of the cable. Thus, the prior art cables do not meet all of the requirements for a drop cable that is suitable for routing optical waveguides to the subscriber.

DETAILED DESCRIPTION OF THE INVENTION

Figure 2:
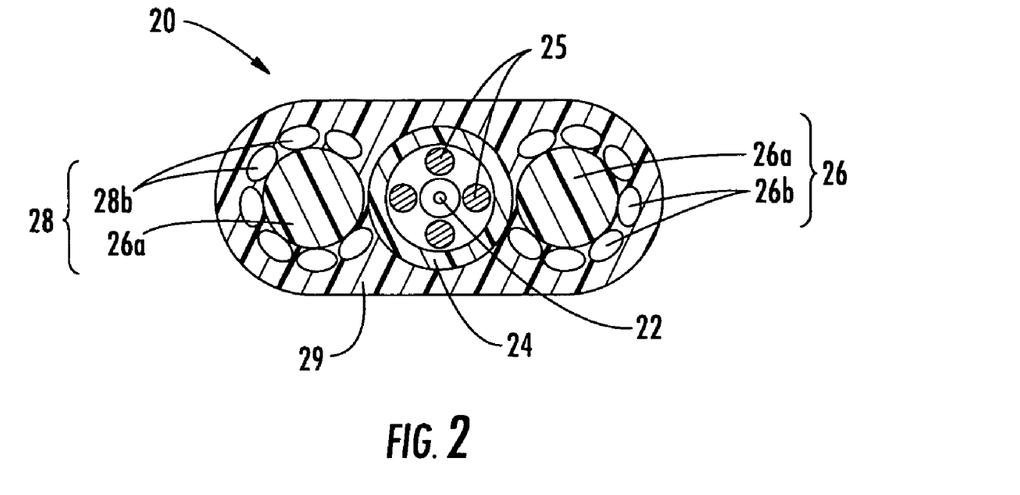
FIG. 2 is a cross-sectional view of a fiber optic cable according to the present invention.

FIG. 2 depicts a cross-sectional view of an exemplary fiber optic cable 20 according to the present invention suitable for the rigors of the outdoor environment. Fiber optic cable 20 is intended for applications that route optical fibers to the premises of the subscriber or to close to the subscriber such as to the curb; however, cables according to the present invention can have other applications. Optical fiber cable 20 includes at least one optical fiber 22, a buffer tube 24, a first strength assembly 26, a second strength assembly 28, and a cable jacket 29. As depicted, first and second strength assemblies 26,28 use two different types of strength elements, namely, at least one strength component 26a,28a and a plurality of strength members 26b,28b. As used herein, "strength component" means a strength element that has anti-buckling strength such as a glass-reinforced plastic (grp) rod and "strength member" means a strength element that essentially lacks anti-buckling strength such as aramid fibers, glass rovings, and/or other suitable tensile yarns.

Using first and second strength assemblies 26,28 are advantageous because besides providing the necessary tensile strength for the fiber optic cables, they allow for greater cable flexibility while still providing the necessary anti-buckling characteristics required for outdoor applications. Cable flexibility is desired in cables intended for subscriber applications because, for instance, it allows for coiling and storing excess cable length and makes the cable easier to route and work with for both the craftsman and factory personnel. In cable 20, strength assemblies 26,28 are generally disposed on opposite sides of buffer tube 24, thereby imparting a preferential bend characteristic to the cable. Additionally, strength assemblies 26,28 are arranged so that the respective plurality of strength members 26b,28b are radially disposed about at least half of a circumference of the respective strength components 26a,28a. In other embodiments, the plurality of strength members are arranged so that they are radially disposed about the majority, if not the entire, circumference of the strength member.

Strength components 26a,28a of respective strength assemblies 26,28 provide fiber optic cable 20 with the majority of its anti-buckling strength along with other characteristic that preserve optical performance. In other words, strength components 26a,28a generally resist the shrinking of cable jacket 29 during temperature variations, generally inhibit bending of the cable, and provide tensile strength. However, strength components 26a,28a are not intended to carry the entire tensile load of the cable and are selected to allow a desired degree of bending, thereby making the cable suitable for subscriber applications where the appropriate flexibility is required. Strength components 26a,28a preferably are dielectric rods of an all dielectric fiber optic cable design. By way of example, strength components are glass-reinforced plastic (grp) rods having a diameter of about 1 mm or less, but other suitable strength component materials, shapes, and/or sizes are possible. For instance, other suitable materials for strength components include conductive wires such as steel and copper.

Strength members 26b,28b of respective strength assemblies 26,28 provide tensile strength to fiber optic cable 20 while still allowing flexibility since the strength members are rovings that generally speaking lack anti-buckling characteristics. In other words, strength members 26b,28b generally provide tensile strength while allowing bending of the cable. Consequently, fiber optic cables according to the present invention balance the strength element characteristics of the strength components and strength members, thereby preserving optical performance in the outdoor environment while providing the desired flexibility and handling characteristics for ease of use in subscriber applications. By way of example, the plurality of strength members 26b,28b are fiberglass yarns or rovings that at least partially contact the respective strength components. Of course, other suitable strength component materials, shapes, and/or sizes are possible. For instance, other suitable materials for strength members include aramid fibers and other high-strength materials such as ultrahigh molecular weight polyethylene sold under the tradename SPECTRA. In one advantageous embodiment, strength members 26b,28b include a matrix material that promotes adhesion to cable jacket 29 such as RPLPE ARAGLASS available from NEPTCO, Inc. of Pawtucket, R.I. In still other embodiments, strength members can include a water-swellable component for blocking the migration of water in the cable.

Optical waveguide 22 is preferably a single-mode optical fiber having a tight-buffer layer (not numbered) formed from a polymer or a UV material; however, other types or configurations of optical fibers can be used. For example, optical fibers 22 can be multi-mode, pure-mode, erbium doped, polarization-maintaining fiber, plastic, other suitable types of light waveguides, and/or combinations thereof. For instance, each optical fiber 22 can include a silica-based core that is operative to transmit light and is surrounded by a silica-based cladding having a lower index of refraction than the core. Additionally, one or more coatings can be applied to optical fiber 25 during manufacture for protecting the cladding. For example, a soft primary coating surrounds the cladding, and a relatively rigid secondary coating surrounds the primary coating. The coating can also include an identifying means such as ink or other suitable indicia for identification and/or an anti-adhesion agent that inhibits the removal of the identifying means. Additionally, optical waveguide 22 can have other configurations such being included in a ribbon or a bundle. Suitable optical fibers are commercially available from Corning Incorporated of Corning, N.Y.

Buffer tube 24 is preferably constructed of a polymeric material and is suitably dimensioned for receiving the optical waveguides therein. However, other suitable materials and shapes can be used for buffer tube 24. Buffer tube 24 of the present invention can also include additives for improving flame-retardance; however, any other suitable additives such as for processing can be used. As depicted in FIG. 2, at least a portion of strength components 26a,28a contact buffer tube 24. This construction ensures the location of the strength components 26a,28a for connectorization purposes and generally results in a cable with a relatively small footprint, but other configurations are possible such as water-swellable tape wrapped about buffer tube 24. Additionally, buffer tube 24 can have other suitable components or features such as a water-swellable material thereon or a ripcord within a tube wall.

As depicted, fiber optic cable 20 includes at least one water-swellable component therein for inhibiting the migration of water along the cable. Specifically, fiber optic cable 20 includes at least one, and preferably, a plurality of water-swellable yarns or threads 25 disposed within buffer tube 24, but the use of a water-swellable powder or coating is also possible. Water-swellable yarns 25 can serve the function of water-blocking and also act as a coupling element for the optical waveguide. A degree of coupling of the optical waveguide with a portion of the cable is generally desirable for inhibiting optical waveguide 22 from migrating along the tube or cavity and/or inhibiting the transfer of forces from the optical waveguide to the optical connector. Water-swellable yarns 25 can at least intermittently couple optical waveguide 22 with buffer tube 24. In one embodiment, water-swellable yarns 25 have an excess length compared with optical waveguide 22, thereby aiding with coupling. Coupling of optical waveguide 22 is achievable in other manners using other suitable coupling elements. For instance, tube 24 may include other coupling elements such as a thixotropic material such as a grease or gel, a water-swellable tape, a foam tape with or without a water-blocking characteristic, or other like materials that may couple intermittently or continuously along the optical waveguide.

Cable jacket 29 is preferably constructed from a suitable polymeric material for protecting the cable from the rigors of the outdoor environment. Cable jacket 29 generally surrounds buffer tube 24 housing optical waveguide 22 and strength assemblies 26,28. As depicted, fiber optic cable 20 has a generally flat cross-section, but other suitable cross-section are possible. Moreover, cable jacket 29 can include ripcords embedded therein or other preferential tear portions for aiding the craft in opening the cable for fiber access. Additionally, cable jacket 29 can include a toning lobe (not shown) having a conductive wire embedded therein for locating the cable in buried environments.

Figure 3:
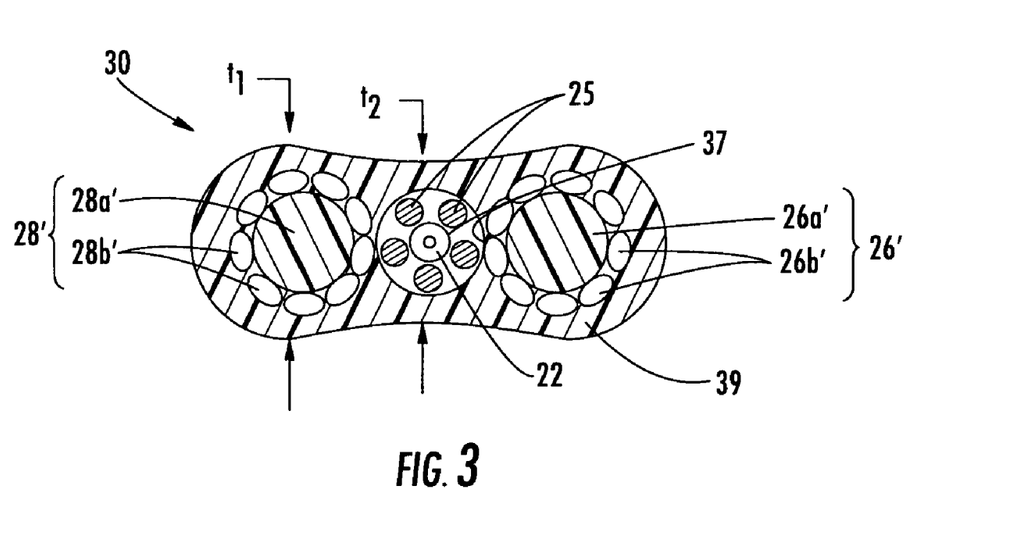
FIG. 3 is a cross-sectional view of another fiber optic cable according to the present invention.

FIG. 3 depicts a fiber optic cable 30, which is another embodiment according to the present invention. Fiber optic cable 30 is a tubeless cable design that includes at least one optical fiber 22, a plurality of water-blocking yarns 25, strength assemblies 26',28', and cable jacket 39. Fiber optic cable 30 is a tubeless cable design that excludes a buffer tube within a cavity 37 of cable jacket 39. As depicted, the plurality of strength members 26b',28b' of respective strength assemblies 26',28' are arranged so that they are radially disposed about the majority, and nearly the entire, circumference of respective strength members 26a',28a'. Of course, other variations using the concepts of the present invention can arrange the strength members and/or strength components in other suitable arrangements such as discrete placements of the strength components and strength assembly; rather, than as a strength assembly.

Cavity 37 of cable jacket 39 includes tight-buffered optical fiber 22 and a plurality of water-blocking yarns 25. In this embodiment, water-blocking yarns are multi-functional since they inhibit the migration of water and act as a coupling element for optical waveguide 22. Tight-buffered optical fiber should not be confused with optical fiber(s) disposed in a buffer tube. Specifically, buffer tubes typically include one or more optical fibers disposed therein that float in a water-blocking grease or the like. Moreover, buffer tubes typically have a relatively large inner diameter compared with the outer diameter of the optical fiber(s) therein. Whereas, one skilled in the art would understand that a buffered optical fiber such as a tight-buffered fiber typically includes a single optical fiber having a buffer layer with an inner diameter that is generally speaking closely matched to the outer diameter of the optical fiber and coupled thereto.

In this embodiment, cable jacket 39 includes a profile that inhibits the transfer of clamping forces to the portion of the cable about cavity 37 and directs the clamping forces to the strength assemblies. In other words, cable jacket 39 includes a hour-glass shaped cross-section where a maximum thickness, i.e., the hips, occurs adjacent to at least one of the strength assemblies and preferably occurs adjacent to both strength assemblies 26',28'. Also, the cross-section of cable jacket 39 includes a minimum thickness, i.e., a waist, adjacent to the cavity 37 of cable jacket, thereby inhibiting the transfer of clamping forces to this area and protecting optical fiber 22. Likewise, the concepts of cable jacket cross-section may be applied to cable designs other than tubeless.

Figure 4:
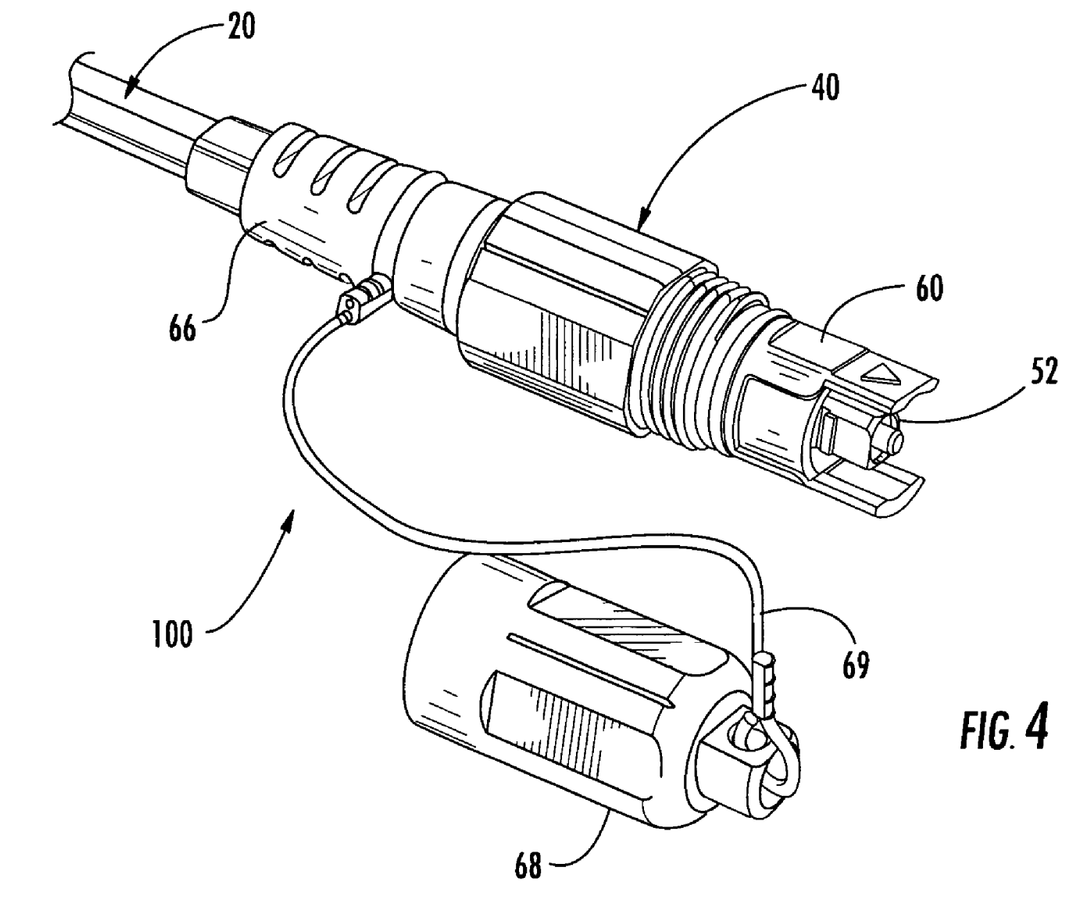
FIG. 4 is an assembled perspective view of the preconnectorized fiber optic drop cable according to the present invention.

The concepts of the present invention also provide flexibility in connectorization process of the fiber optic cable. In other words, a connector can grip the strength members, the strength component, or both the strength members and strength components as desired. FIG. 4 depicts a perspective view of one end of an exemplary preconnectorized fiber optic cable assembly 40 using fiber optic cable 20 and an optical plug connector 50 using a connector assembly 52 of the SC type. But, of course, other types of connector assemblies such as LC, FC, ST, MT, and MT-RJ are contemplated by the present invention by using a suitable crimp housing. In this embodiment, optical plug connector 50 merely crimps to strength components 26a,28b, but other suitable arrangements crimping arrangements contemplated by the present invention.

Figure 5:
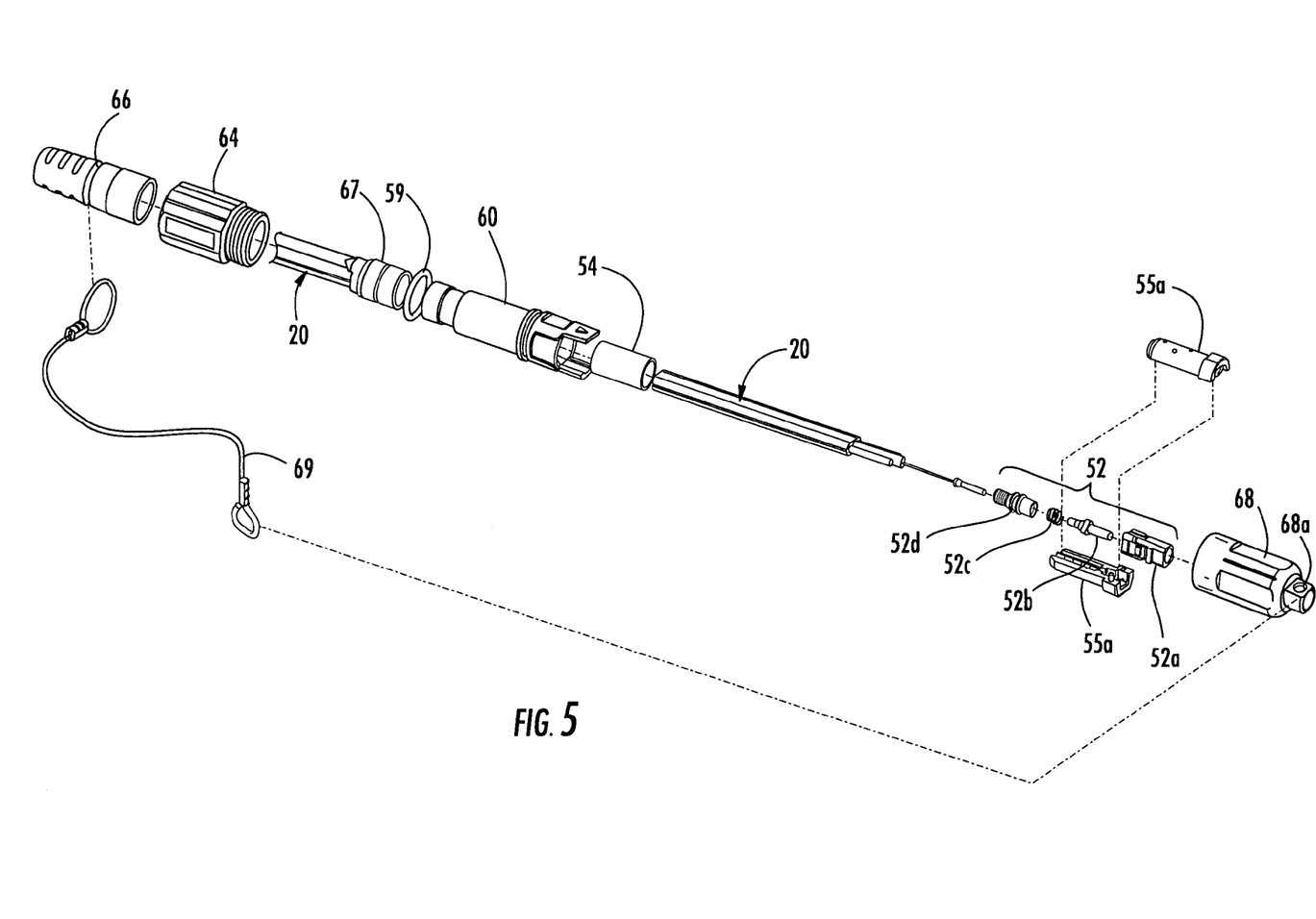
FIG. 5 is an exploded view of the preconnectorized fiber optic drop cable of FIG. 4.

FIG. 5 depicts an exploded view of preconnectorized cable 100 showing cable 20 and plug connector 50. In this embodiment, plug connector 50 includes an industry standard SC type connector assembly 52 having a connector body 52a, a ferrule 52b in a ferrule holder (not numbered), a spring 52c, and a spring push 52d. Plug connector 50 also includes a crimp assembly (not numbered) that includes a crimp housing having at least one half-shell 55a and a crimp band 54, a shroud 60 having an O-ring 59, a coupling nut 64, a cable boot 66, a heat shrink tube 67, and a protective cap 68 secured to boot 66 by a wire assembly 69.

Generally speaking, most of the components of plug connector 50 are formed from a suitable polymer. Preferably, the polymer is a UV stabilized polymer such as ULTEM 2210 available from GE Plastics; however, other suitable materials are possible. For instance, stainless steel or any other suitable metal may be used for various components.

Figure 6A:
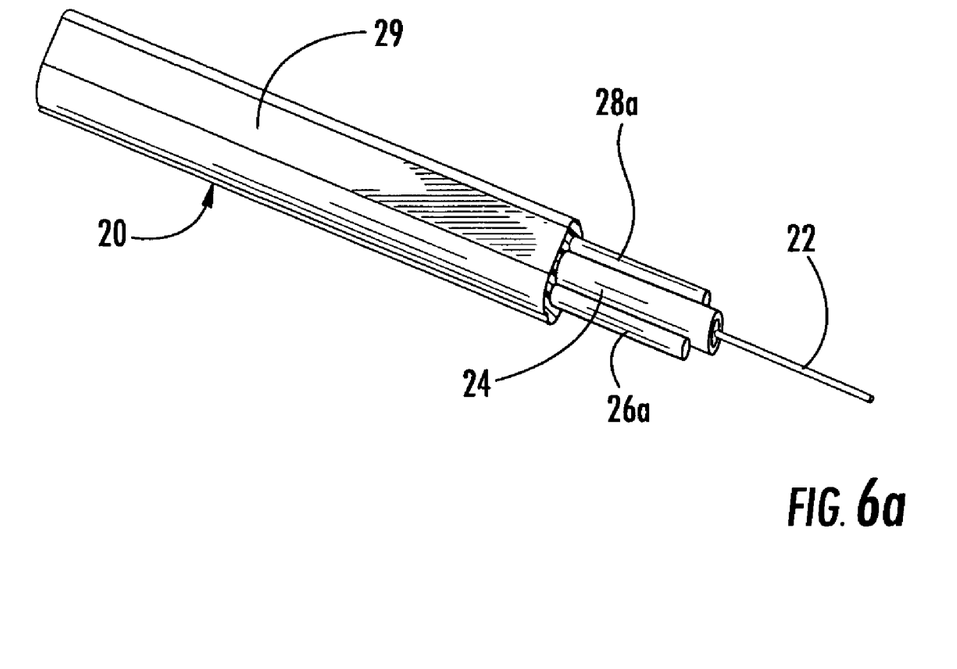
FIG. 6a is a perspective view of the cable of FIG. 5 prepared for connectorization.
Figure 6B:
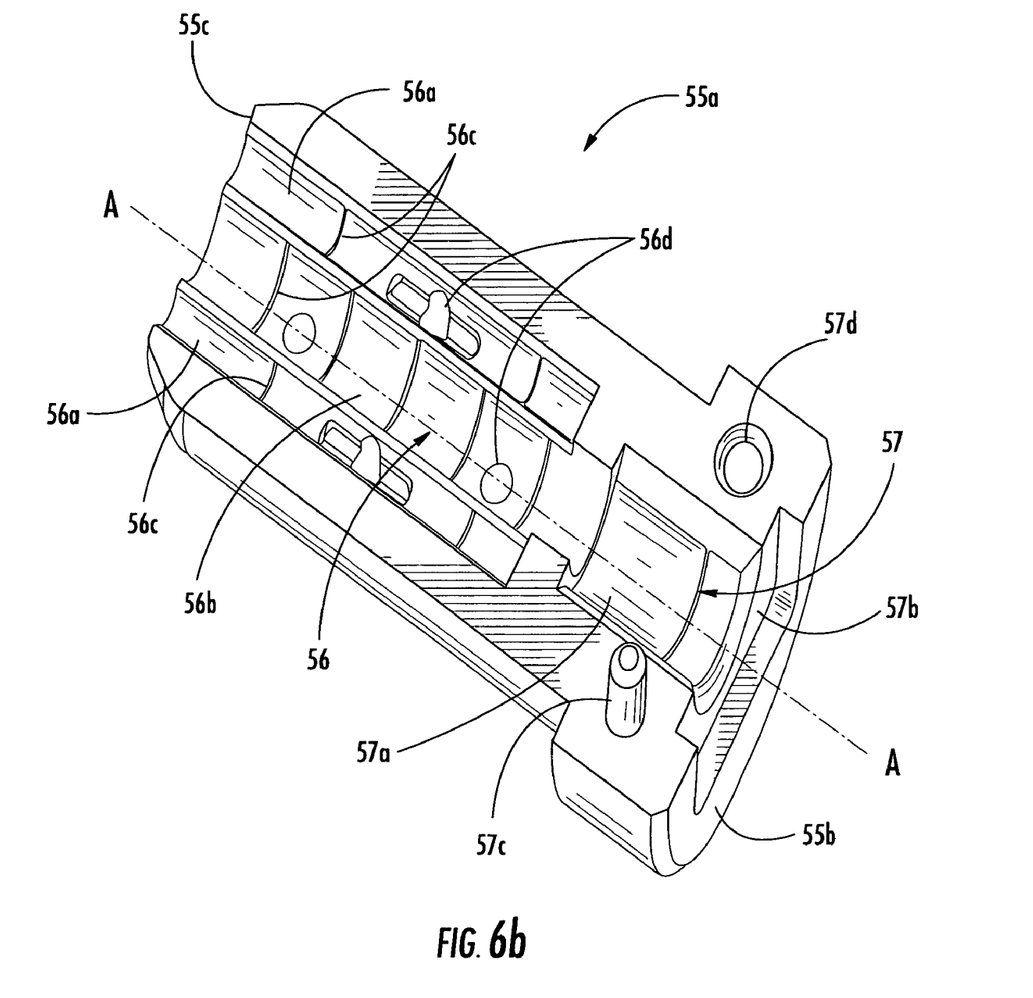
FIG. 6b is a perspective view of one half-shell of the crimp housing of FIG. 5.
Figure 6C:
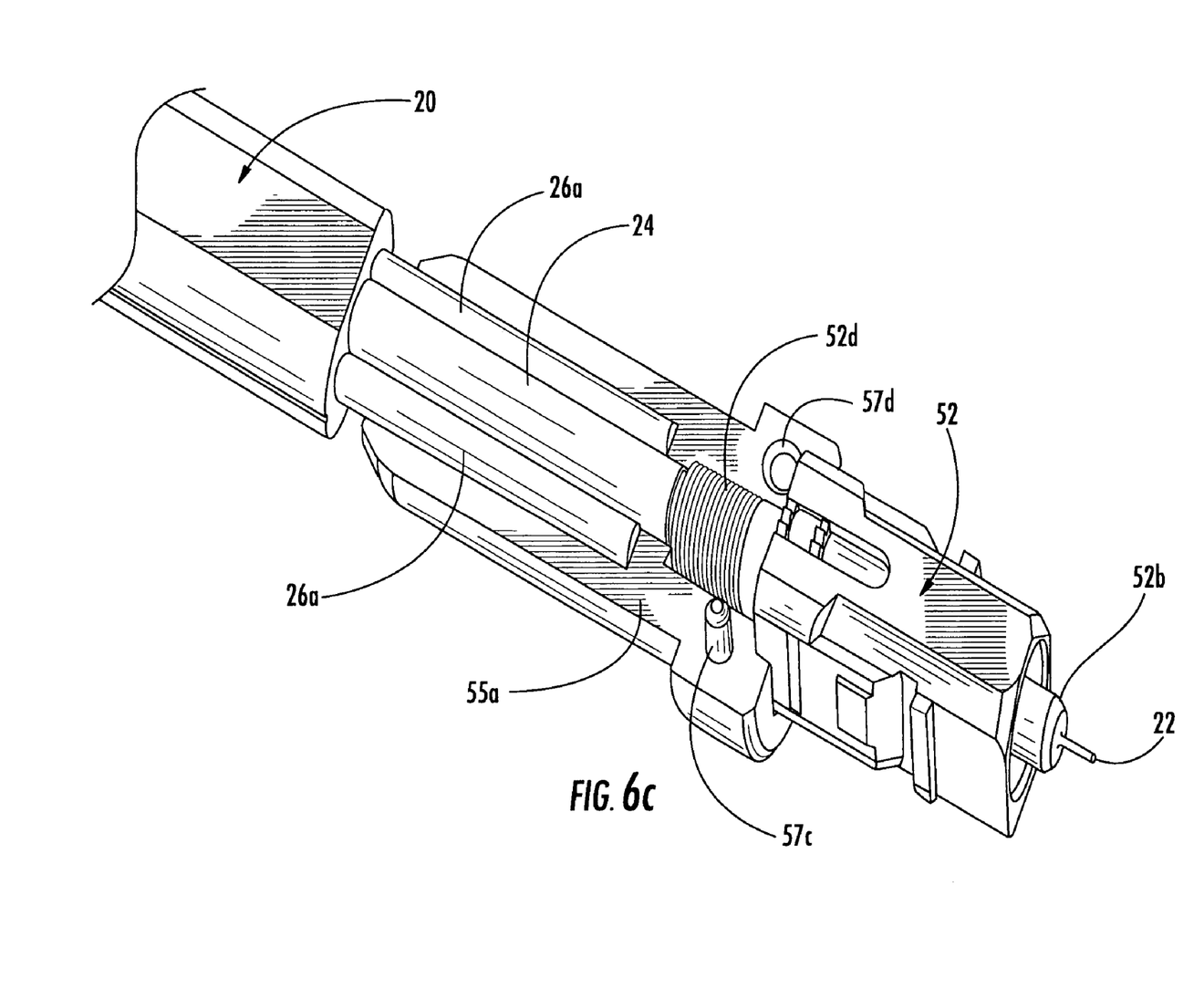
FIG. 6c shows a portion of the connector assembly of FIG. 4 attached to the cable and positioned within the half-shell of FIG. 6b.
Figure 6D:
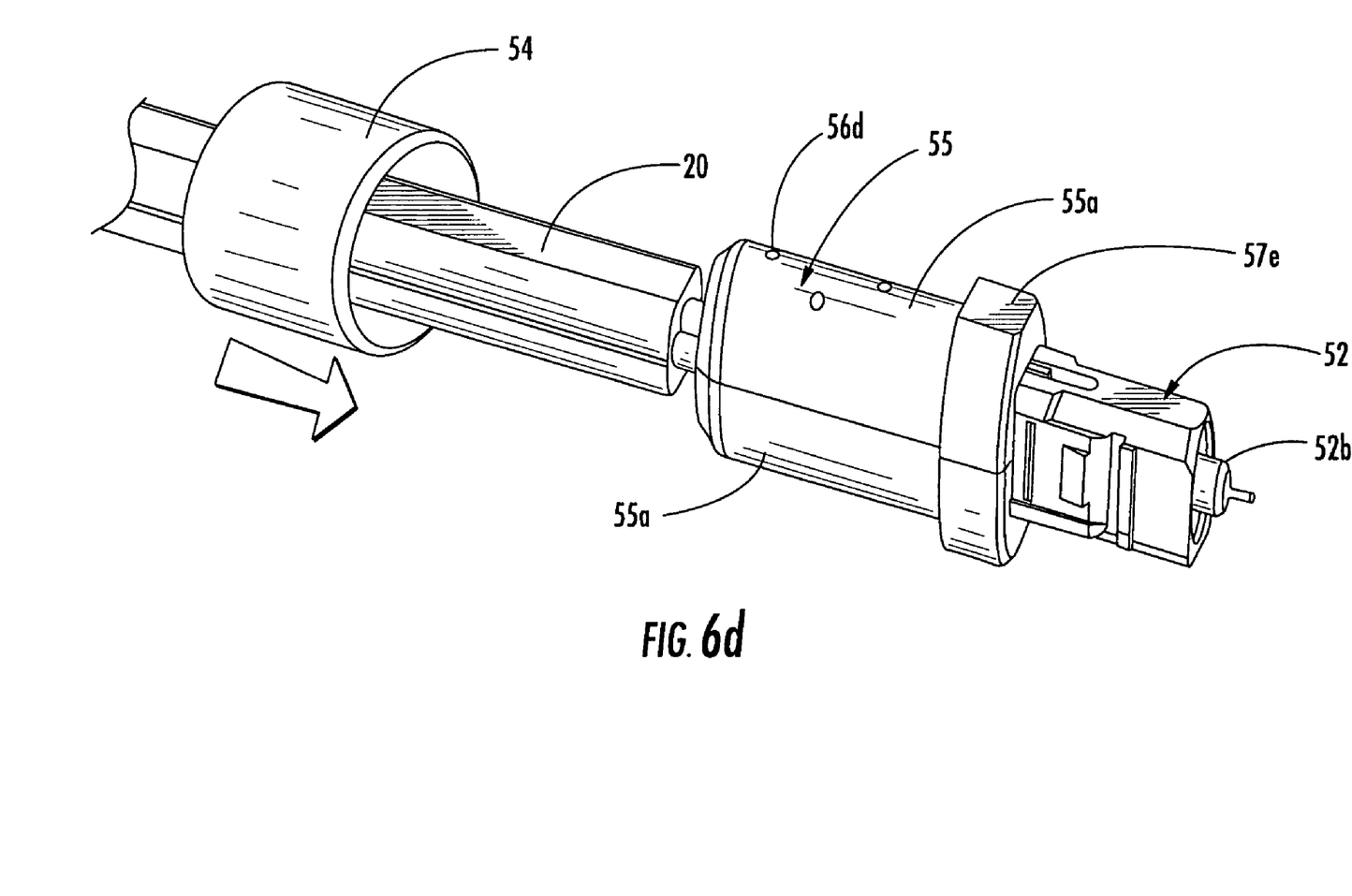
FIG. 6d shows the partially assembly crimp assembly being attached to the cable.

As best shown in FIG. 6d, the crimp assembly includes crimp housing 55 and crimp band 54. Crimp housing 55 has two half-shells 55a that are held together by crimp band 54 when the preconnectorized cable is assembled. Although, the term half-shell is used, it is to be understood that it means suitable shells and includes shells that are greater than or less than half of the crimp housing. Crimp band 54 is preferably made from brass, but other suitable crimpable materials may be used. Crimp housing 55 is configured for securing connector assembly 52 as well as providing strain relief to cable 20. This advantageously results in a relatively compact connector arrangement using fewer components. Moreover, the crimp assembly allows preconnectorized cable 100 to be assembled quickly and easily. Of course, other embodiments are possible according to the present invention. For instance, connector body 52a may be integrally molded into crimp housing 55 in a ST type configuration so that a twisting motion of the crimp housing secures the ST-type connector with a complementary mating receptacle.

FIGS. 6a–6d depict several steps during the process of attaching the crimp assembly to cable 20. FIG. 6a shows cable 20 having strength members 26b,28b (not visible) and water-swellable yarns 25 (not visible) cut flush with the stripped back jacket 29, thereby exposing the two strength components 26a,28a along with buffer tube 24 and optical fiber 22 from the end of cable 20. FIG. 6b shows the inner surface of one half-shell 55a. In this case, only one half-shell 55a is illustrated since two symmetrical half-shells are used for both halves of crimp housing 55. In other embodiments there may be a first half-shell and a second half-shell, which are different. For instance, one half-shell may have two alignment pins, rather than each half-shell having a single alignment pin.

As shown in FIG. 6b, half-shell 55a includes a first end 55b for securing connector assembly 52 and a second end 55c that provides strain relief. A longitudinal axis A—A is formed between first end 55b and second end 55c near the center of crimp housing 55, through which half of a longitudinal passage is formed. When assembled, optical fiber 22 passes through the longitudinal passage and is held in a bore of ferrule 52b. Additionally, half-shell 55a includes a cable clamping portion 56 and a connector assembly clamping portion 57.

Cable clamping portion 56 has two outboard half-pipe passageways 56a and a central half-pipe passageway 56b that is generally disposed along longitudinal axis A—A.

Half-pipe passageways 56*a* and 56*b* preferably include at least one rib 56*c* for securely clamping optical component 42 and strength components 44 after crimp band 54 is crimped, thereby completing the crimp assembly. Moreover, half-pipe passageways 56*a* and 56*b* are sized for the strength elements, in this case, strength components of cable 20, but the passageways can be sized for different crimping/cable configurations.

Likewise, half-shell 55*a* has a connector assembly clamping portion 57 that is sized for attaching connector assembly 52. Specifically, connector assembly clamping portion 57 has a half-pipe passageway 57*a* that opens into and connects central half-pipe passageway 56*b* and a partially rectangular passageway 57*b*. Half-pipe passageway 57*a* is sized for securing spring push 52*d* and may include one or more ribs for that purpose. Rectangular passageway 57*b* holds a portion of connector body 52*a* therein and inhibits the rotation between connector assembly 52 and the crimp assembly. FIG. 6*c* depicts prepared cable 20 of FIG. 6*a* having connector assembly 52 attached and positioned in a first half-shell 55*a*. The alignment of the two half shells is accomplished by inserting pins 57*c* into complementary bores 57*d* of the two half-shells. FIG. 6*d* shows both half-shells 55*a* of crimp housing 55 disposed about cable 20 before crimp band 54 is installed thereover. Additionally, half-shells may include one or more bores 56*d* that lead to one of half-pipe passageways 56*a* or 56*b*. Bores 56*d* allow for inserting an adhesive or epoxy into the crimp housing 55, thereby providing a secure connection for strain relief.

When fully assembled the crimp assembly fits into shroud 60. Additionally, crimp housing 55 is keyed to direct the insertion of the crimp assembly into shroud 60. In this case, half-shells 55*a* include planar surfaces 57*e* (FIG. 6*d*) on opposites sides of crimp housing 55 to inhibit relative rotation between crimp housing 55 and shroud 60. In other embodiments, the crimp assembly may be keyed to the shroud using other configurations such as a complementary protrusion/groove or the like.

Shroud 60 has a generally cylindrical shape with a first end 60*a* and a second end 60*b*. Shroud generally protects connector assembly 52 and in preferred embodiments also keys plug connector 50 with a respective mating receptacle (not shown). Moreover, shroud 60 includes a through passageway between first and second ends 60*a* and 60*b*. As discussed, the passageway of shroud 60 is keyed so that crimp housing 54 is inhibited from rotating when plug connector 50 is assembled. Additionally, the passageway has an internal shoulder (not numbered) that inhibits the crimp assembly from being inserted beyond a predetermined position.

Figure 5A:
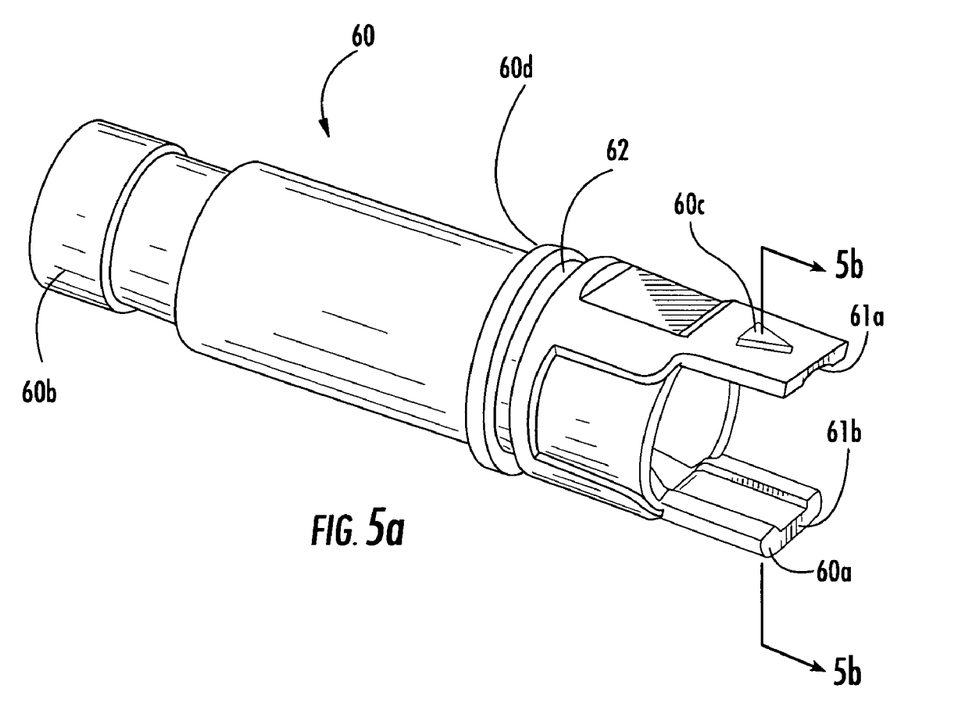
FIGS. 5a and 5b respectively are a perspective view and a sectional view of the shroud of FIG. 4.
Figure 5B:
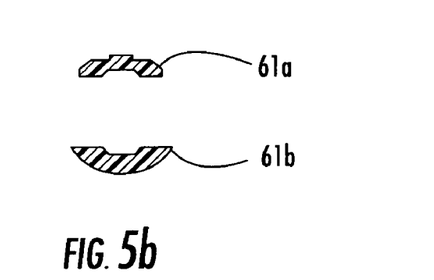

As best shown in FIGS. 5*a* and 5*b*, first end 60*a* of shroud 60 includes at least one opening (not numbered) defined by shroud 60. The at least one opening extends from a medial portion of shroud 60 to first end 60*a*. In this case, shroud 60 includes a pair of openings on opposite sides of first end 60*a*, thereby defining alignment portions or fingers 61*a*,61*b*. In addition to aligning shroud 60 with receptacle during mating, alignment fingers 61*a*,61*b* may extend slightly beyond connector assembly 52, thereby protecting the same. As shown in FIG. 5*b*, alignment fingers 61*a*,61*b* have different shapes so plug connector 50 and the receptacle only mate in one orientation. In preferred embodiments, this orientation is marked on shroud 60 using alignment indicia 60*c* so that the craftsman can quickly and easily mate preconnectorized cable 100 with the receptacle. In this case, alignment indicia 60*c* is an arrow molded into the top alignment finger of shroud 60, however, other suitable indicia may be used. The arrow is aligned with complimentary alignment indicia disposed on the receptacle, thereby allowing the craftsman to align indicia so that alignment fingers 61*a*,61*b* can be correcting seated into the complimentary receptacle. Thereafter, the craftsman engages the external threads of coupling nut 64 with the complimentary internal threads of receptacle to make the optical connection.

A medial portion of shroud 60 has a groove 62 for seating an O-ring 59. O-ring 59 provides a weatherproof seal between plug connector 50 and the receptacle or protective cap 68. The medial portion also includes a shoulder 60*d* that provides a stop for coupling nut 64. Coupling nut 64 has a passageway sized so that it fits over the second end 60*b* of shroud 60 and easily rotates about the medial portion of shroud 60. In other words, coupling nut 64 cannot move beyond shoulder 60*d*, but coupling nut 64 is able to rotate with respect to shroud 60. Second end 60*b* of shroud 60 includes a stepped down portion having a relatively wide groove (not numbered). This stepped down portion and groove are used for securing heat shrink tubing 67. Heat shrink tubing 67 is used for weatherproofing the preconnectorized cable. Specifically, the stepped down portion and groove allow for the attachment of heat shrink tubing 67 to the second end 60*b* of shroud 60. The other end of heat shrink tubing 67 is attached to cable jacket 29, thereby inhibiting water from entering plug connector 50.

After the heat shrink tubing 67 is attached, boot 66 is slid over heat shrink tubing 67 and a portion of shroud 60. Boot 66 is preferably formed from a flexible material such as KRAYTON. Heat shrink tubing 67 and boot 66 generally inhibit kinking and provide bending strain relief to the cable near plug connector 50. Boot 66 has a longitudinal passageway (not visible) with a stepped profile therethrough. The first end of the boot passageway is sized to fit over the second end of shroud 60 and heat shrink tubing 67. The first end of the boot passageway has a stepped down portion sized for cable 20 and the heat shrink tubing 67 and acts as stop for indicating that the boot is fully seated. After boot 66 is seated, coupling nut 64 is slid up to shoulder 60*c* so that wire assembly 69 can be secured to boot 66. Specifically, a first end of wire assembly 69 is positioned about groove 66*a* on boot 66 and wire 69*a* is secured thereto using a first wire crimp (not numbered). Thus, coupling nut 64 is captured between shoulder 60*c* of shroud 60 and wire assembly 69 on boot 66. This advantageously keeps coupling nut 64 in place by preventing it from sliding past wire assembly 69 down onto cable 40.

A second end of wire assembly 69 is secured to protective cap 68 using a second wire crimp (not numbered). Consequently, protective cap 68 is prevented from being lost or separated from preconnectorized cable 100. In this embodiment, wire assembly 69 is attached to protective cap 68 at an eyelet 68*a*. Eyelet 68*a* is also useful for attaching a fish-tape so that preconnectorized cable 100 can be pulled through a duct. Protective cap 68 has internal threads for engaging the external threads of coupling nut 64. Moreover, O-ring 59 provides a weatherproof seal between plug connector 50 and protective cap 68 when installed. When threadly engaged, protective cap 68 and coupling nut 64 may rotate with respect to the remainder of preconectorized cable 100, thus inhibiting torsional forces during pulling.

Many modifications and other embodiments of the present invention, within the scope of the appended claims, will become apparent to a skilled artisan. For example, the cables having other configurations such as other suitable outer designs, shapes, and/or sizes. Therefore, it is to be understood that the invention is not to be limited to the specific embodiments disclosed and that modifications and other embodiments may be made within the scope of the appended claims. Although specific terms are employed herein, they are used in a generic and descriptive sense only and not for purposes of limitation. The invention has been described with reference to cables intended for subscriber applications, but the inventive concepts of the present invention are applicable to other suitable applications as well.

The invention claimed is:

1. A fiber optic drop cable comprising:
   at least one optical waveguide;
   a tube, the at least one optical waveguide being disposed within the tube;
   a first strength assembly, the first strength assembly comprises a first strength component and a first plurality of strength members, wherein the first plurality of strength members are radially disposed about at least half of the circumference of the first strength component and at least a portion of the first strength component contacts the tube and some of the first plurality of strength members at least partially contact the first strength component;
   a second strength assembly, the second strength assembly comprises a second strength component and a second plurality of strength members, the second plurality of strength members are radially disposed about at least half of the circumference of the second strength component and at least a portion of the second strength component contacts the tube, wherein the first and second strength assemblies are generally disposed on opposite sides of the tube and some of the second plurality of strength members at least partially contact the second strength component; and
   a cable jacket, the cable jacket generally surrounding the at least one optical waveguide, the tube, the first strength assembly, and the second strength assembly.

2. The fiber optic drop cable of claim 1, at least one of the first and second strength components being a glass reinforced plastic rod.

3. The fiber optic drop cable of claim 1, further including at least one water-swellable component.

4. The fiber optic drop cable of claim 1, further including at least one water-swellable yarn.

5. The fiber optic drop cable of claim 1, the at least one optical waveguide being tight-buffered optical fiber.

6. The fiber optic drop cable of claim 1, the at least one optical waveguide being at least intermittently coupled with the tube using a coupling element.

7. The fiber optic drop cable of claim 1, the at least one optical waveguide being a tight buffered optical fiber and a plurality of water-swellable yarns disposed within the tube.

8. The fiber optic drop cable of claim 1, the cable being a portion of a preconnectorized fiber optic cable assembly.

9. A fiber optic drop cable comprising;
   at least one tight buffered optical fiber;
   at least one water-swellable component;
   a tube, the at least one tight-buffered optical fiber and the at least one water-swellable component being disposed within the tube;
   a first strength assembly, the first strength assembly comprises a first strength component and a first plurality of strength members, wherein the first plurality of strength members are radially disposed about at least half of the circumference of the first strength component, end at least a portion of the first strength component contacts the tube, and some of the first plurality of strength members at least partially contact the first strength component;
   a second strength assembly, the second strength assembly comprises a second strength component and a second plurality of strength members, the second plurality of strength members are radially disposed about at least half of the circumference of the second strength component, at least a portion of the second strength component contacts the tube, and some of the second plurality of strength members at least partially contact the second strength component, wherein the first and second strength assemblies are generally disposed on opposite sides of the tube; and
   a cable jacket, the cable jacket generally surrounding the at least one tight buffered optical fiber, the first strength assembly, and the second strength assembly.

10. The fiber optic drop cable of claim 9, the at least one water-swellable component being a water-swellable yarn.

11. The fiber optic drop cable of claim 9, at least one of the first and second strength components being a glass reinforced plastic rod.

12. The fiber optic drop cable of claim 9, the at least one optical fiber being at least intermittently coupled with the tube using a coupling element.

13. The fiber optic drop cable of claim 9, the cable being a portion of a preconnectorized fiber optic cable assembly.

14. A tubeless fiber optic drop cable comprising:
    at least one optical waveguide;
    a first strength assembly, the first strength assembly comprises a first strength component and a first plurality of strength members, wherein the first plurality of strength members are radially disposed about at least half of the circumference of the first strength component and some of the first plurality of strength members at least partially contact the first strength component;
    a second strength assembly, the second strength assembly comprises a second strength component and a second plurality of strength members, the second plurality of strength members are radially disposed about at least half of the circumference of the second strength component and some of the second plurality of strength members at least partially contact the second strength component; and
    a cable jacket, the cable jacket defining a cavity therethrough that houses the at least one optical waveguide and the cable jacket surrounding the first strength assembly, and the second strength assembly, wherein the first and second strength assemblies are generally disposed on opposite sides of the cavity.

15. The fiber optic drop cable of claim 14, wherein the cavity of the cable jacket includes at least one water-swellable component.

16. The fiber optic drop cable of claim 14, the at least one optical waveguide being tight-buffered optical fiber and at least one water-swellable yarn being disposed within the cavity.

17. The fiber optic drop cable of claim 14, the first and second strength component being a glass reinforced plastic rod.

18. The fiber optic drop cable of claim 14, the cable jacket having a cross-section where a minimum cable thickness occurs adjacent to the cavity of the cable jacket.

19. The fiber optic drop cable of claim 14, the cable jacket having a cross-section where a maximum cable thickness occurs adjacent to at least one of the strength assemblies.

20. The fiber optic drop cable of claim 14, the at least one optical fiber being at least intermittently coupled with the cavity using a coupling element.

21. The fiber optic drop cable of claim 14, the at least one optical fiber being a tight buffered optical fiber and a plurality of water-swellable yarns disposed within the cavity.

22. The fiber optic drop cable of claim 14, the cable being a portion of a preconnectorized fiber optic cable assembly.

* * * * *